United States Patent [19]

Hajaligol et al.

[11] Patent Number: 5,188,130
[45] Date of Patent: Feb. 23, 1993

[54] CHEMICAL HEAT SOURCE COMPRISING METAL NITRIDE, METAL OXIDE AND CARBON

[75] Inventors: Mohammad R. Hajaligol, Richmond; Seetharama C. Deevi; Sarojini D. Ariprala, both of Midlothian; Donald B. Losee, Richmond; Bruce E. Waymack, Prince George; Michael L. Watkins, Richmond, all of Va.

[73] Assignee: Philip Morris, Incorporated, New York, N.Y.

[21] Appl. No.: 443,636

[22] Filed: Nov. 29, 1989

[51] Int. Cl.$^5$ .............................................. A24B 15/00
[52] U.S. Cl. .................................. 131/359; 131/369; 252/636; 252/640
[58] Field of Search ................ 131/359, 364; 252/636, 252/640

[56] References Cited

U.S. PATENT DOCUMENTS

| | | | |
|---|---|---|---|
| 1,771,366 | 7/1930 | Wyss et al. | |
| 2,104,266 | 1/1938 | McCormick | 131/12 |
| 2,907,686 | 10/1959 | Siegel | 131/2 |
| 3,200,819 | 8/1965 | Gilbert | 128/208 |
| 3,258,015 | 6/1966 | Ellis et al. | 131/171 |
| 3,356,094 | 12/1967 | Ellis et al. | 131/266 |
| 3,681,018 | 8/1972 | Knauff | 23/191 |
| 3,878,041 | 4/1975 | Litnaker et al. | 252/636 |
| 3,943,941 | 3/1976 | Boyd et al. | 131/2 |
| 4,141,369 | 2/1979 | Burruss | 131/171 A |
| 4,303,083 | 12/1981 | Burruss, Jr. | 131/271 |
| 4,340,072 | 7/1982 | Bolt et al. | 131/273 |
| 4,515,763 | 5/1985 | Boudart et al. | 423/409 |
| 4,624,828 | 11/1986 | Alexander | 252/640 |
| 4,708,151 | 11/1987 | Shelar | 131/359 |
| 4,714,082 | 12/1987 | Banerjee et al. | 131/359 |
| 4,780,299 | 10/1988 | Kumagai et al. | 423/412 |
| 4,784,978 | 11/1988 | Ogasawara et al. | 501/96 |
| 4,793,365 | 12/1988 | Sensabaugh, Jr. et al. | 131/194 |
| 4,799,979 | 1/1989 | Baldi | 149/5 |
| 4,800,183 | 1/1989 | Quinby | 501/96 |
| 4,851,206 | 7/1989 | Boudart et al. | 423/409 |

FOREIGN PATENT DOCUMENTS 0117355 12/1983 European Pat. Off. .
0236992 3/1987 European Pat. Off. .
0245732 5/1987 European Pat. Off. .

OTHER PUBLICATIONS

K. H. Jack, "The Iron-Nitrogen System: The Crystal Structures of $\epsilon$-Phase Iron Nitrides", *Acta Crystallographica*, 5, pp. 404-411 (1952).

K. H. Jack, "Binary and ternary interstitial alloys I. The iron-nitrogen system: the structures of Fe4N and Fe2N", *Proceedings of the Royal Society*, A, 195, pp. 34-40 (1948).

K. H. Jack, "The iron-nitrogen system: the preparation and the crystal structures of nitrogen-austenite ($\gamma$) and nitrogen-martensite ($\alpha$)", *Proceedings of the Royal Society*, A, 208, pp. 200-215 (1952).

*Primary Examiner*—V. Millin
*Assistant Examiner*—J. Doyle
*Attorney, Agent, or Firm*—Marta E. Gross

[57] ABSTRACT

A chemical heat source comprising metal nitride, metal oxide and carbon, particularly useful in smoking articles, and methods of making the heat source are provided. The metal nitride of the heat source has an ignition temperature substantially lower than conventional carbonaceous heat sources, while at the same time provides sufficient heat to release a flavored aerosol from a flavor bed for inhalation by the smoker. Upon combustion the heat source produces virtually no carbon monoxide. The metal nitride is prepared by pre-forming the starting materials into a desired shape, and converting them to metal nitride in situ, without substantially altering the shape of the starting materials.

56 Claims, 3 Drawing Sheets

FIG. 3

CHEMICAL HEAT SOURCE COMPRISING METAL NITRIDE, METAL OXIDE AND CARBON

BACKGROUND OF THE INVENTION

This invention relates to a metal nitride heat source and to improved methods for making the heat source. The methods and heat sources of this invention are particularly suitable for use in a smoking article, such as that described in copending U.S. Pat. application Ser. No. 223,153, filed on Jul. 22, 1988 (PM-1322) and commonly assigned herewith. The heat sources have low ignition and high combustion temperatures and generate sufficient heat to release a flavored aerosol from a flavor bed for inhalation by the smoker. Upon combustion, the heat sources of this invention produce substantially no carbon monoxide or nitrogen oxides.

According to the methods of this invention, the metal species is mixed with a carbon source, heated and converted to metal nitride by contacting the mixture with a nitriding material. In a preferred embodiment, the metal species/carbon source mixture is pre-formed into a desired shape and converted to metal nitride in situ, without substantially altering the shape of the mixture.

There have been previous attempts to provide a heat source for a smoking article. While providing a heat source, these attempts have not produced a heat source having all of the advantages of the present invention.

For example, Siegel U.S. Pat. No. 2,907,686 discloses a charcoal rod coated with a concentrated sugar solution which forms an impervious layer during burning. It was thought that this layer would contain gases formed during smoking and concentrate the heat thus formed.

Ellis et al. U.S. Pat. No. 3,258,015 and Ellis et al. U.S. Pat. No. 3,356,094 disclose a smoking device comprising a nicotine source and a tobacco heat source.

Boyd et al. U.S. Pat. No. 3,943,941 discloses a tobacco substitute which consists of a fuel and at least one volatile substance impregnating the fuel. The fuel consists essentially of combustible, flexible and self-coherent fibers made of a carbonaceous materials containing at least 80% carbon by weight. The carbon is the product of the controlled pyrolysis of a cellulose-based fiber containing only carbon, hydrogen and oxygen.

Bolt et al. U.S. Pat. No. 4,340,072 discloses an annular fuel rod extruded or molded from tobacco, a tobacco substitute, a mixture of tobacco substitute and carbon, other combustible materials such as wood pulp, straw and heat-treated cellulose or a sodium carboxymethylcellulose (SCMC) and carbon mixture.

Shelar et al. U.S. Pat. No. 4,708,151 discloses a pipe with replaceable cartridge having a carbonaceous fuel source. The fuel source comprises at least 60–70% carbon, and most preferably 80% or more carbon, and is made by pyrolysis or carbonization of cellulosic materials such as wood, cotton, rayon, tobacco, coconut, paper and the like.

Banerjee et al. U.S. Pat. No. 4,714,082 discloses a combustible fuel element having a density greater than 0.5 g/cc. The fuel element consists of comminuted or reconstituted tobacco and/or a tobacco substitute, and preferably contains 20%–40% by weight of carbon.

Published European patent application 0 117 355 by Hearn et al. discloses a carbon heat source formed from pyrolized tobacco or other carbonaceous material such as peanut shells, coffee bean shells, paper, cardboard, bamboo, or oak leaves.

Published European patent application 0 236 992 by Farrier et al. discloses a carbon fuel element and process for producing the carbon fuel element. The carbon fuel element contains carbon powder, a binder and other additional ingredients, and consists of between 60 and 70% by weight of carbon.

Published European patent application 0 245 732 by White et al. discloses a dual burn rate carbonaceous fuel element which utilizes a fast burning segment and a slow burning segment containing carbon materials of varying density.

These heat sources are deficient because they provide unsatisfactory heat transfer to the flavor bed, resulting in an unsatisfactory smoking article, i.e., one which fails to simulate the flavor, feel and number of puffs of a conventional cigarette.

Copending U.S. Pat. application Ser. No. 223,232, filed on Jul. 22, 1988 (PM-1319) and commonly assigned herewith, solved this problem by providing a carbonaceous heat source formed from charcoal that maximizes heat transfer to the flavor bed, releasing a flavored aerosol from the flavor bed for inhalation by the smoker, while minimizing the amount of carbon monoxide produced.

However, all conventional carbonaceous heat sources liberate some amount of carbon monoxide gas upon ignition. Moreover, the carbon contained in these heat sources has a relatively high ignition temperature, making ignition of conventional carbonaceous heat sources difficult under normal lighting conditions for a conventional cigarette.

Attempts have been made to produce non-combustible heat sources for smoking articles in which heat is generated electrically. E.g., Burruss, Jr., U.S. Pat. No. 4,303,083, Burruss U.S. Pat. No. 4,141,369, Gilbert U.S. Pat. No. 3,200,819, McCormick U.S. Pat. No. 2,104,266 and Wyss et al. U.S. Pat. No. 1,771,366. These devices are impractical and none has met with any commercial success.

Attempts have been made to produce a combustible, non-carbonaceous heat source. Copending U.S. Pat. application Ser. No. 281,496, filed on Dec. 12, 1988 (PM-1326) and commonly assigned herewith relates the use of a metal carbide heat source. Although combustion of the metal carbide heat source yields up to tenfold less carbon monoxide than combustion of conventional carbonaceous heat sources, some carbon monoxide is still produced.

Attempts have been made to produce pyrophoric materials comprising metal aluminides for use as a decoy for heat-seeking missiles. E.g., Baldi, U.S. Pat. No. 4,799,979. These devices, however, combust too rapidly and produce too intense a heat to be used as a heat source in a smoking article.

Methods of producing iron nitride by converting iron oxide to iron nitride are known. These methods generally involve treating metallic iron with a hydrogen/ammonia/molecular nitrogen mixture. E.g., K.H. Jack, *Proceedings of the Royal Society, A.* 195 pp. 34–40 (1948); K.H. Jack, *Acta Crystallographica*, 5, pp. 404–411 (1952); K.H. Jack, *Proceedings of the Royal Society, A*, 208, pp. 200–215 (1952); Knauff U.S. Pat. No. 3,681,018. These methods produced the iron nitride by a series of non-continuous steps, rendering these methods unsuitable for the large scale production of iron nitride. Moreover, the iron nitride produced by these methods possesses high thermal stability and low chemical reactivity and is, therefore, difficult to ignite, rendering it unsuitable for use as a heat source.

A further shortcoming of known methods of preparing iron nitride is that iron nitride is produced only in particulate form and must be formed into a shape suitable for use as a heat source. Iron nitrides by nature are brittle, intractable materials, which, once formed, are difficult and expensive to form into a suitable shape.

It would be desirable to provide a heat source that liberates virtually no carbon monoxide or nitrogen oxides upon combustion.

It would also be desirable to provide a heat source that has a low temperature of ignition to allow for easy lighting under conditions typical for a conventional cigarette, while at the same time having a combustion temperature high enough to provide sufficient heat to release flavors from a flavor bed.

It would further be desirable to provide a heat source that does not self-extinguish prematurely.

It would also be desirable to provide a heat source which is stable at ambient temperature and humidity.

It would be desirable to provide an inexpensive method of producing metal nitride which allows for control of end product distribution.

It would further be desirable to provide a method of producing metal nitride in which the starting materials are pre-formed into a desired shape and converted in situ to metal nitride.

SUMMARY OF THE INVENTION

It is an object of this invention to provide a heat source that liberates virtually no carbon monoxide or nitrogen oxides upon combustion.

It is also an object of this invention to provide a heat source that has a low ignition temperature to allow for easy lighting under conditions typical for a conventional cigarette, while at the same time having a combustion temperature high enough to provide sufficient heat to release flavors from a flavor bed.

It is yet another object of this invention to provide a heat source that does not self-extinguish prematurely.

It is yet another object of this invention to provide heat source which is stable at ambient temperature and humidity.

It is a further object of this invention to provide an inexpensive method of producing metal nitride which allows for control over end product distribution.

It is also an object of this invention to provide a method of producing metal nitride in which the starting materials are pre-formed into a desired shape and converted in situ to metal nitride.

In accordance with this invention, the heat source is formed from materials having a substantial metal nitride content. Preferably, the heat source comprises substantially metal nitride, with smaller amounts of carbon, and metal oxide. Catalysts and burn additives may be added to promote complete combustion and to provide other desired burn characteristics.

Metal nitrides are hard, brittle compounds characterized by high melting points. Metal nitrides are interstitial alloys having atomic nitrogen bound in the interstices of the parent metal lattice. The nitride lattice is closely related to the cubic or hexagonal close-packed pure metal lattice. Metal nitrides can have a wide range of stoichiometries. Iron nitride, for example, can have formulas ranging from $Fe_2N$ to $Fe_{16}N_2$ (Goldschmidt, H.I. *Interstitial Alloys*, pp. 214-231 (ButterWorth, London, 1967)).

Upon combustion, the metal nitride heat sources of this invention liberate substantially no carbon monoxide or nitrogen oxides. The metal nitride has an ignition temperature substantially lower than that of conventional carbonaceous heat sources, and is, therefore, easier to light. Once ignited, the carbon component of the heat source yields additional heat upon combustion, thereby preventing premature self-extinguishment. While not wishing to be bound by theory, it is believed that combustion of the metal nitrides produces metal oxides and molecular nitrogen, without formation of any significant amount of nitrogen oxides. The metal oxides act as oxidation catalysts to promote the conversion of carbon monoxide (CO) to carbon dioxide ($CO_2$).

According to the method of this invention, a metal species and a carbon source are combined and heated to reduce the metal species. Preferably the metal species/carbon source is pre-formed into a desired shape before heating. The mixture is then contacted with a nitriding material which reacts preferentially with the reduced metal. The product of the nitridation reaction is a heat source comprising metal nitride, metal oxide, and carbon, which has retained the shape of the metal species/carbon source starting materials.

While the heat sources of this invention are particularly useful in smoking devices, it is to be understood that they are also useful as heat sources for other applications, where having the characteristics described herein is desired.

BRIEF DESCRIPTION OF THE DRAWINGS

The above and other objects and advantages of this invention will be apparent upon consideration of the following detailed description, taken in conjunction with the accompanying drawings, in which like reference characters refer to like parts through out, and in which.

DETAILED DESCRIPTION OF THE INVENTION

Figure 2:
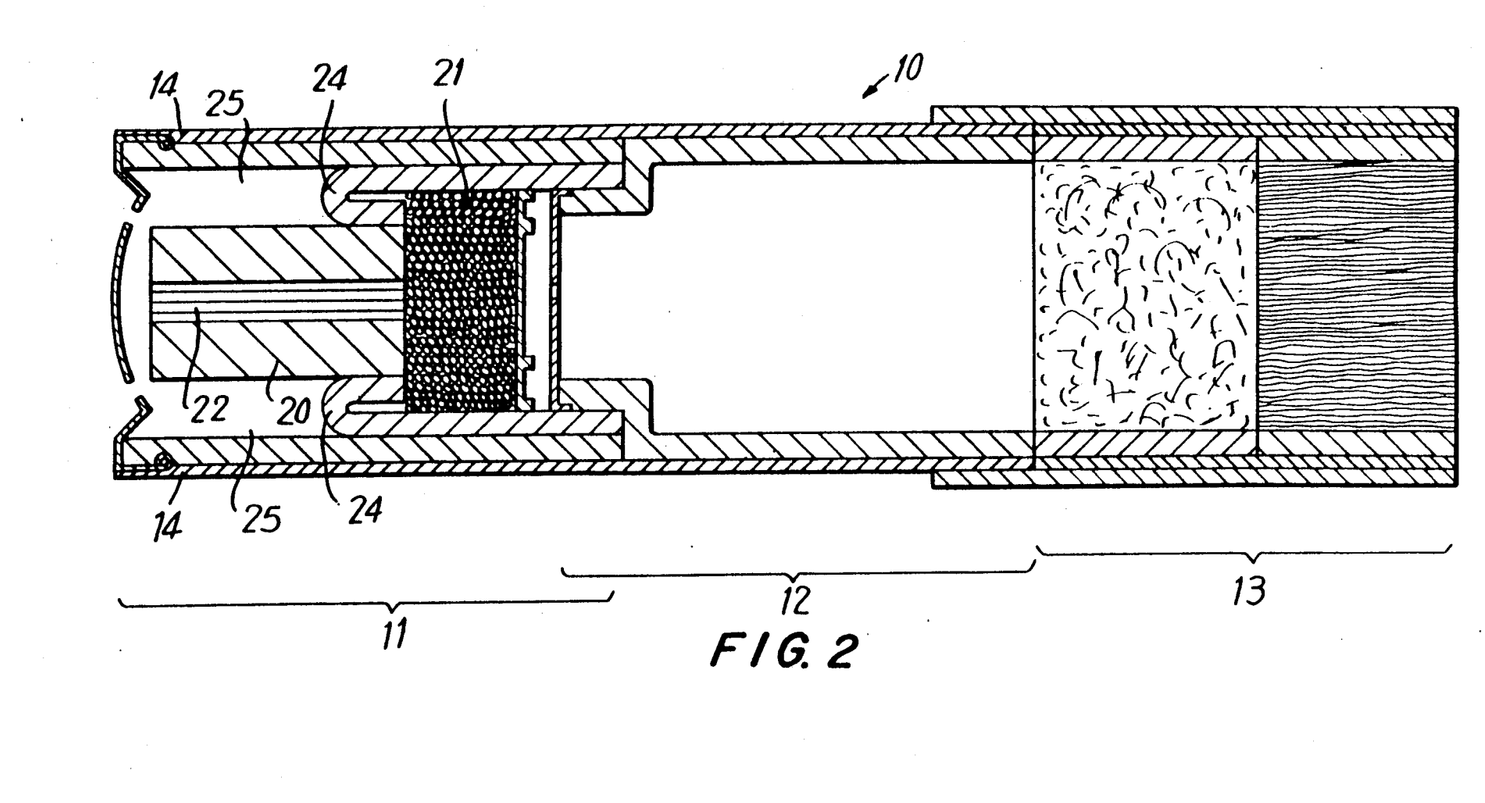
FIG. 2 depicts a longitudinal cross-sectional view of a smoking article in which the heat source of this invention may be used.

Smoking article 10 consists of an active element 11, an expansion chamber tube 12, and a mouthpiece element 13, overwrapped by a cigarette wrapping paper 14. Active element 11 includes a metal nitride heat source 20 and a flavor bed 21 which releases flavored vapors when contacted by hot gases flowing through heat source 20. The vapors pass into expansion chamber tube 12, forming an aerosol that passes to mouthpiece element 13, and then into the mouth of a smoker.

Heat source 20 should meet a number of requirements in order for smoking article 10 to perform satisfactorily. It should be small enough to fit inside smoking article 10 and still burn hot enough to ensure that the gases flowing therethrough are heated sufficiently to release enough flavor from flavor bed 21 to provide flavor to the smoker. Heat source 20 should also be capable of burning with a limited amount of air until the metal combusting in the heat source is expended. Upon combustion, heat source 20 should produce substantially no carbon monoxide or any of the nitrogen oxides. Combustion, the interaction of the heat source with oxygen during puffing to produce heat and light, is flameless and glowing.

Heat source 20 should have a surface area preferably in the range from about 65 $m^2/g$ to about 150 $m^2/g$, more preferably from about 115 $m^2/g$ to about 130 $m^2/g$. Additionally, the heat source made by this invention contain macropore (pores of between about 1 and about 5 microns), mesopores (pores of between about 20 Å and about 500 Å in size) and micropores (pores of up to about 20 Å in size).

Heat source 20 should have an appropriate thermal conductivity. If too much heat is conducted away from the burning zone to other parts of the heat source, combustion at that point will cease when the temperature drops below the extinguishment temperature of the heat source, resulting in a smoking article which is difficult to light and which, after lighting, is subject to premature self-extinguishment. Such self-extinguishment is also prevented by having a heat source that undergoes essentially 100% combustion. The thermal conductivity should be at a level that allows heat source 20, upon combustion, to transfer heat to the air flowing through it without conducting heat to mounting structure 24. Oxygen coming into contact with the burning heat source will almost completely oxidize the heat source, limiting oxygen release back into expansion chamber tube 12. Mounting structure 24 should retard oxygen from reaching the rear portion of the heat source 20, thereby helping to extinguish the heat source after the flavor bed has been consumed. This also prevents the heat source from falling out of the end of the smoking article.

The metal nitride used to make the heat sources of this invention may be prepared by:
1) mixing a metal species with a carbon source to form a mixture;
2) supplying heat to the mixture; and
3) contacting the mixture with a nitriding material to form a metal nitride.

The metal species may be any metal-containing molecule capable of being converted to metal nitride. Preferably, the metal species is zirconium oxide, iron oxide, metallic zirconium, metallic iron, or a mixture thereof. More preferably, the metal species is iron oxyhydroxide, $Fe_3O_4$, or FeO, and, most preferably, $Fe_2O_3$. Different phases of the various metal species may be used without substantially affecting the method of the invention or the course of the nitridation reaction. Either a naturally-occurring or synthetic metal species may be used.

The carbon source is added in the form of substantially pure carbon, although materials which may be subsequently converted to carbon may be also used. Preferably, the carbon source is colloidal graphite, and, more preferably, activated carbon or activated charcoal.

In combining the metal species with a carbon source, a sufficient amount of carbon should be added to the metal species so that some carbon remains in the composition following the nitridation step. Preferably, between about 5% and about 45% and, more preferably, between about 15% and about 35% by weight of carbon is added to form the metal species/carbon source mixture.

The metal species/carbon source should be in particulate form. Preferably, the particle size of the metal species and carbon source range up to about 300 microns. More preferably, the particles of the metal species should range in size between about submicron and 20 microns, while the particle size of the carbon source should range in size between about submicron and about 40 microns. The particles may be prepared at the desired size, or they may be prepared at a larger size and ground down to the appropriate size.

The surface areas of the metal species and the carbon source particles are critical. The greater the surface area, the greater the reactivity of the metal species and the carbon source, resulting in a more efficient conversion. Preferably, the surface area of the metal species particles should range between about 0.2 $m^2/g$ to about 300 $m^2/g$. More preferably, the particles should have a surface area of between about 1 $m^2/g$ and about 150 $m^2/g$. Preferably, the carbon particles should range in surface area between about 0.5 $m^2/g$ and about 2000 $m^2/g$. More preferably, the carbon particle surface area should range between about 100 $m^2/g$ and about 600 $m^2/g$.

The metal species and the carbon source may be combined in a solvent. Any solvent which increases the fluidity of the metal species/carbon source mixture and does not affect the chemical reactivities of the individual components may be used. Preferred solvents include polar solvents such as methanol, ethanol, and acetone and, most preferably, water.

The metal species/carbon source mixture may then be combined with a carbonaceous binder which confers greater mechanical stability to the metal species/carbon source mixture. During the conversion of the mixture to metal nitride, the binder decomposes into carbon, carbon dioxide and carbon monoxide. The metal species/carbon source mixture may be combined with the binder using any convenient method known in the art.

Any number of binders can be used to bind the particles of the metal species/carbon source mixture. The binder material may be used in combination with other additives such as potassium citrate, sodium chloride, vermiculite, bentonite, calcium carbonate, flavorants, or burn additives. Any binder that decomposes upon heating to CO and $CO_2$ may be used. Preferable binders are carbonaceous, and include gums such as guar gum, cellulose derivatives, such as methylcellulose, carboxymethylcellulose, and hydroxypropyl cellulose, flour, starches, sugar, alginates, polyvinyl alcohols, and vegetable oil, or mixtures thereof. An especially preferred carbonaceous binder material is a mixture of flour and sugar combined with corn oil, preferably at a ratio of about 200 parts flour, about 103 parts sugar and about 26 parts corn oil. The metal oxide/carbon mixture as described above is preferably combined with the flour/sugar/corn oil binder system along with a solvent so that the mixture has a consistency suitable for extrusion.

The metal species/carbon source mixture may then be pre-formed into a desired shape. Any method capable of pre-forming the mixture into a desired shape may be used. Preferred methods include slip casting, injection molding, and die compaction, and, most preferably, extrusion.

Any desired shape may be used in the method of this invention. Those skilled in the art will understand that a particular application may require a particular shape. In a preferred embodiment, the mixture is formed into an elongated rod. Preferably, the rod is about 30 cm in length. The diameter of the heat source may range from about 3.0 mm to about 8.0 mm, preferably between about 4.0 mm to about 5.0 mm. A final diameter of approximately 4.0 mm allows an annular air space around the heat source without causing the diameter of the smoking article to be larger than that of a conventional cigarette. The rods before baking are called green rods. Because variations in the dimensions of the rod may occur during baking (see discussion, infra), it is preferable to form the green rods at a slightly larger diameter than the final diameter of the heat source.

Figure 1:
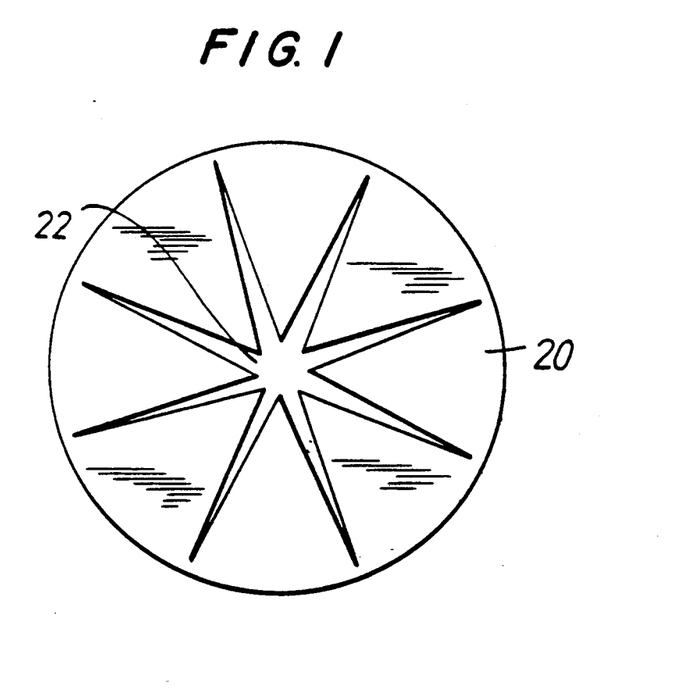
FIG. 1 depicts an end view of one embodiment of the heat source of this invention.

In order to maximize the transfer of heat from the heat source to flavor bed 21, one or more air flow passageways 22, as described in copending U.S. Pat. application Ser. No. 223,232, may be formed through or along the circumference of heat source 20. The air flow passageways should have a large geometric surface area to improve the heat transfer to the air flowing through the heat source. The shape and number of the passageways should be chosen to maximize the internal geometric surface area of heat source 20. Alternatively, the heat source may be formed with a porosity sufficient to allow heat flow through the heat source. When the heat source is ignited and air is drawn through the smoking article, the air is heated as it passes around or through the heat source or through, over or around the air flow passageways. The heated air flows through a flavor bed, releasing a flavored aerosol for inhalation by the smoker. Any configuration that gives rise to a sufficient number of puffs and minimizes the CO produced either under FTC conditions or under more extreme conditions that a smoker may create is within the scope of this invention. Preferably, when longitudinal air flow passageways such as those depicted in FIG. 1 are used, maximization of heat transfer to the flavor bed is accomplished by forming each longitudinal air flow passageway 22 in the shape of a multi-pointed star. Even more preferably, as set forth in FIG. 1, each multi-pointed star should have long narrow points and a small inside circumference defined by the innermost edges of the star. These star-shaped longitudinal air flow passageways provide a larger area of heat source 20 available for combustion, resulting in a greater volume of composition involved in combustion, and, therefore, a hotter burning heat source.

The green rods are then placed on graphite sheets which are stacked one over the other in a stainless steel container or on a stainless steel frame. The container containing the stacked graphite sheets is then placed in a heating or baking device such as a muffle furnace or a sagger. Once inside the heating device, the rods are exposed to an environment that will allow the conversion of the metal species to metal nitride. Preferably, the heating device is pressurized slightly above one atmosphere to prevent diffusion of gases from the external atmosphere to within the heating device.

Figure 3:
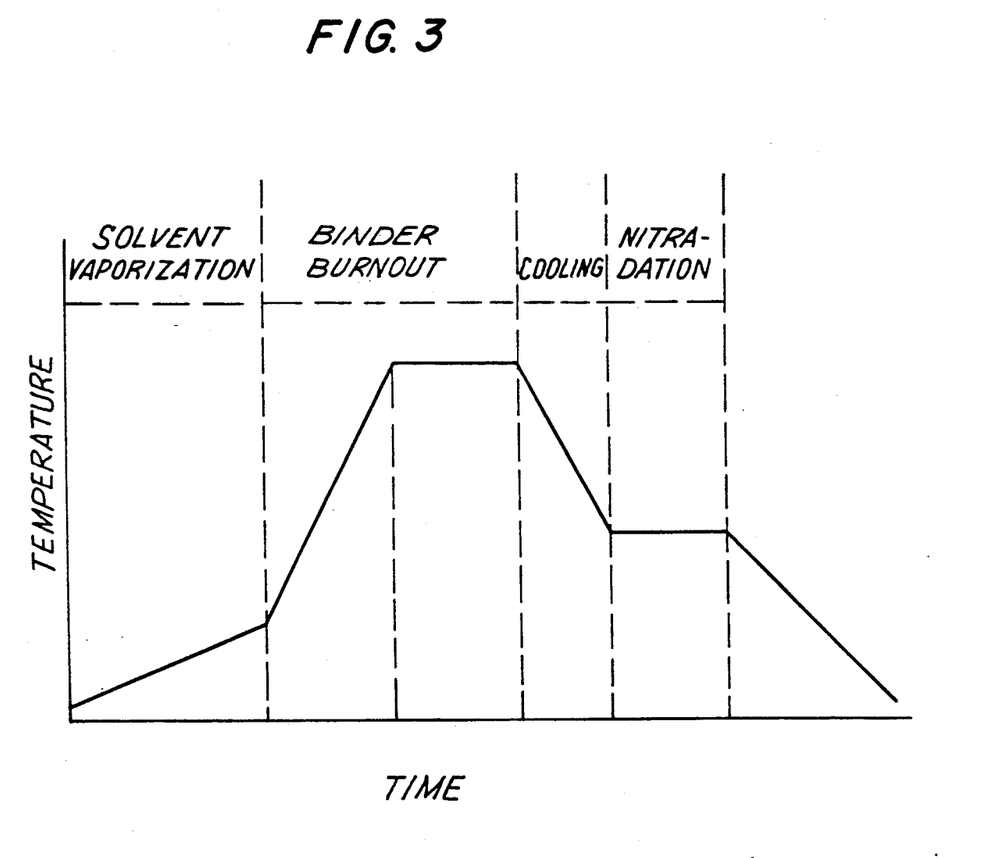
FIG. 3 depicts heat vs. reaction time for the chemical conversion of the iron species to iron nitride. The origin in FIG. 3 is the point at which heat is supplied to the iron species/carbon mixture.

The chemical conversion may be accomplished by supplying heat to the green rods. Heat may be supplied in a variety of ways as follows: 1) so that a constant temperature is maintained; 2) in a series of intervals; 3) at an increasing rate, which may be either constant or variable; or 4) combinations therof. Additionally, steps such as allowing the rods to cool may be employed. Preferably, however, heat is supplied, as described in FIG. 3, in a multiple stage baking process involving binder burnout followed by nitridation. Those skilled in the art will understand that thermal processes (such as solvent vaporization and binder burnout) may occur at a wide variety of temperatures and pressures.

Binder burnout involves the vaporization of any solvent present in the rod as well as the vaporization and carbonization of the carbonaceous binder. Furthermore, some reduction of the metal species occurs. Binder burnout is accomplished by gradually supplying heat to the rod under an inert atmosphere such as helium, nitrogen, or argon, or in a vacuum. It is preferable to supply heat to the rod at a first, low rate of increase, followed by a second, greater rate of increase.

The first low rate of temperature increase allows for vaporization of any solvent present in the rod without formation of ruptures and cracks in the rod. Additionally, a low rate of temperature increase minimizes warping and bending of the rod. The initial rate of increase should be between about 0.1° C./min to about 10° C./min, and preferably in the range of about 0.2° C./min to about 5° C./min. This rate of increase is maintained until a temperature in the range of about 100° C. to about 200° C., and a more preferable temperature is about 125° C., is reached and all solvents are vaporized.

Once the solvent in the rod has been vaporized, the rate of heating is increased to further decompose carbonaceous binders in the rod and to reduce the metal species. The carbonaceous binder begins to decompose at temperatures in the range of about 200° C. to about 300° C. to a gaseous mixture comprising carbon monoxide and carbon dioxide. Consequently, the rate of heating should be such that the evolution of gaseous products from the rod is sufficiently slow to minimize microexplosions of gaseous products that might adversely affect the structural integrity of the rod. Preferably, the rate of temperature increase should be in the range of about 1° C./min to about 20° C./min and more preferably, in the range of about 5° C./min to about 10° C./min. The temperature is increased at this rate until the maximum temperature is reached and the carbonaceous binders are decomposed. Preferably, the maximum temperature is between about 650° C. to about 900° C., and more preferably in the range of about 675° C. to about 825° C.

The maximum temperature and the length of time the rods remain at the maximum temperature determines the strength of the rod and its chemical composition. The strength of the rod should be sufficient to withstand high speed manufacturing processes, although the strength may be adjusted to match a particular application.

Reduction of the metal species occurs during the heating process by contact with a reducing gas. During heating, the carbonaceous binder decomposes to yield, inter alia, carbon monoxide, a reducing gas. Furthermore, when activated carbon is used as the carbon source, it reacts with the metal species to generate carbon monoxide and a partially reduced metal species.* With each reduction of the metal species, the CO is oxidized to $CO_2$. Rather than rely totally on carbon and the evolved CO to reduce the metal species, a reducing agent such as hydrogen gas may be added to the atmosphere of the heating device. Preferably CO and $CO_2$ may be be added directly to the heating device atmosphere.

*For example, when the metal species is iron oxide, CO sequentially reduces $Fe_2O_3$ to $Fe_3O_4$, $Fe_3O_4$ to FeO, and FeO to $Fe^0$.

The ratio of CO to $CO_2$ can be manipulated to control end product distribution. The presence of a ratio of CO to $CO_2$ of between about 0.16 and about 6 and more preferably between about 0.3 and about 2.5 has been found to increase the strength of the rod and improve the lightability (the time required to ignite the final heat source) of the final metal nitride-comprising product. Furthermore, the phase homogeneity of the metal products depends upon the $CO/CO_2$ ratio. The preferred $CO/CO_2$ ratio for a particular application may be found by using the method described by H.L. Fairbanks, *Industrial Heating*, 52, pp. 24-26 (1984).

The extent of reduction of the metal species during the binder burnout stage is controlled by the baking temperature and the duration of baking. For example, the reduction of metal species may be complete once the maximum temperature is reached. If not, the maximum temperature should be maintained until the metal species is sufficiently reduced. At the termination of the binder burnout stage, the preferred metal product is substantially a mixture of a metal oxide of low valency* and the fully reduced metal. * A low valency metal oxide is a metal oxide in which the metal is not in the fully oxidized state. Examples of low valency iron oxides include $Fe_3O_4$ and, more preferably, $FeO$. When $FeO$ is the low valency metal oxide, it may be stabilized by adjusting the ratio of $CO:CO_2$ present in the heating device.

Upon completion of the binder burnout stage, the rods are cooled and then contacted with a nitriding material to produce metal nitride. The degree of nitridation and the phase of metal nitride produced will affect the lightability of the heat source. A preferred nitriding material is ammonia. While not wishing to be bound by theory, it is believed that the ammonia reacts preferentially with the fully reduced metal component, leaving the low valency metal oxide substantially unreacted. Preferably the nitriding temperature range is between about 400° C. to about 600° C., and more preferably, between about 450° C. to about 550° C. Preferably, the duration of the nitriding step can range up to about 150 minutes, and preferably between about 30 and about 120 minutes.

The metal nitride produced by the above method may contain localized pyrophoric sites having increased reactivity, which must be passivated. Passivation involves the controlled exposure of the heat source to an oxidant. Preferred oxidants include dilute oxygen, or, more preferably, dilute air. While not wishing to be bound by theory, it is believed that a low concentration of oxidant will eliminate pyrophoric sites while preventing the uncontrolled combustion of the heat source.

As stated above, variations in the dimensions of the rod will occur during baking. Generally, between about 10% to about 20% change in volume will occur as a result of the binder burnout. This change in volume may cause warping or bending. The rod may also suffer inconsistencies in diameter. Following nitridation, therefore, the rod may be tooled, or ground to the dimensions described above. The rod is then cut into the shortened segments of between about 8 mm to about 20 mm, preferably between about 10 mm to about 14 mm.

The rod produced by this method comprises (1) between about 30% and about 40% carbon; (2) between about 40% and 50% metal nitride; and (3) between about 10% and about 20% low valency metal oxide. The rod may additionally contain trace amounts of a high valency metal oxide. The chemical composition of the rods is between (1) about 30% and about 40% carbon; (2) about 0.46% and about 0.62% hydrogen; (3) about 2.08% and about 4.3% nitrogen; (4) about 60% and 70% metal; (5) about 3% and about 6% oxygen.

The metal nitride component of the heat source has an ignition temperature that is sufficiently low to allow for ignition under the conditions for lighting a conventional cigarette. Upon combustion, the carbon component provides additional heat so that the heat source does not prematurely self-extinguish. Combustion of the low valency metal oxide component provides heat upon combustion and acts as a catalyst to promote the oxidation of CO to $CO_2$.

The ignition temperature of the heat source is preferably in the range of between about 175° C. and about 450° C., and, more preferably between about 190° C. and about 400° C. Upon ignition, the heat sources reach a maximum temperature preferably between about 600° C. and about 950° C. and, more preferably, between about 650° C. and about 850° C. The maximum temperature will depend in part upon the smoking conditions and any materials in contact with the heat source which affect the availability of oxygen. Thus, metal nitrides are substantially easier to light than conventional carbonaceous heat sources and less likely to self-extinguish, but at the same time can be made to smolder at lower temperatures, thereby minimizing the risk of fire.

The heat sources made by the method of this invention are stable under a broad range of relative humidity conditions and aging times. For example, aging of heat source up to three months under a variety of relative humidity conditions ranging from about 0% relative humidity to about 100% relative humidity should have virtually no effect on the combustion products. Furthermore, the heat sources undergo virtually no change in dimensions upon aging.

Any metal nitride capable of combusting without generation of nitrogen oxides may be used in the heat sources of this invention. Preferably, the metal nitride is zirconium nitride, and, more preferably, iron nitride having the formula $Fe_xN$, where X is between 2 and 4 inclusive. Mixtures of metal nitrides may also be used.

EXAMPLE 1

710 g $Fe_2O_3$, 250 g activated carbon, 175 g water, and 37.5 g potassium citrate were combined with a binder made from 200 g flour, 103 g sugar and 22 g corn oil. The $Fe_2O_3$/activated carbon/binder mixture was then extruded to form green rods 30 cm in length and 5.05 mm in diameter with a single star air flow passageway. The green rods were placed on graphite sheets and stacked in a fixed-bed reactor at room temperature. Argon with a flow rate of 1 lit/min was used as a carrier gas to purge the gaseous content of reactor. The rods were heated at a rate of 1° C./min until a temperature of 100° C. was reached; the temperature was then increased at a rate of 5° C./min until a temperature of 750° C. was reached. The temperature was maintained at 750° C. for 60 minutes. The reactor was then cooled down at a rate of 10° C./min to a temperature of 450° C. The reactor was purged with dry ammonia and the rods nitrided for 60 minutes at 450° C. The reactor was then cooled to ambient temperature and the reactor purged with argon. The rods were then passivated by introducing $O_2$ until a concentration of 5% $O_2$ was reached. The iron nitride-comprising rod was then cut with a saw into segments of 14 mm to form the heat sources.

EXAMPLE 2

The heat source was produced using conditions identical to those used in Example 1 except that during the heating stage the argon was replaced by a an atmosphere of 75% argon, 25% of a 2:1 mixture of CO/CO$_2$.

EXAMPLE 3

Chemical composition of an iron nitride heat source made by the method described in Example 1:

| Carbon | 32.6% |
| --- | --- |
| Fe$_x$N | 48.8% |
| FeO | 18.5% |

EXAMPLE 4

Combustion of heat sources made by the method described in Example 1 under FTC conditions were performed and the following analyses obtained:

| Ignition temperature | 240° C. |
| --- | --- |
| Total CO evolved | 0.38 mg/heat source |
| Total CO$_2$ evolved | 14.82 mg/heat source |
| Total NO$^2$ evolved | 0.01 mg/heat source |

Thus, this invention provides a heat source comprising a substantial content of metal nitrides; metal oxides; and carbon, that forms virtually no carbon monoxide gas upon combustion and has a significantly lower ignition temperature than conventional carbonaceous heat sources, while at the same time maximizes heat transfer to the flavor bed. One skilled in the art will appreciate that the present invention can be practiced by other than the described embodiments, which are presented herein for the purpose of illustration and not of limitation, and that the present invention is limited only by the claims which follow.

We claim:

1. A method of making metal nitride, comprising the steps of:
    a) mixing a metal species and a carbon source to form a mixture;
    b) supplying heat to the mixture; and
    c) contacting the mixture with a nitriding material to form metal nitride.

2. A method of making a heat source comprising metal nitride, comprising the steps of:
    a) mixing a metal species and a carbon source to form a mixture;
    b) combining the mixture from step a) with a binder;
    c) forming the mixture from step b) into a shape;
    d) supplying heat to the mixture; and
    e) contacting the mixture with a nitriding material to form metal nitride.

3. The method of claim 1 or 2, wherein the metal species is an iron species.

4. The method of claim 3, wherein the iron species is selected from the group consisting of Fe$_2$O$_3$, FeOOH, Fe$_3$O$_4$, FeO, or Fe$^0$.

5. The method of claim 1 or 2, wherein the carbon source is selected from the group consisting of colloidal graphite and activated carbon.

6. The method of claim 1 or 2, wherein the heat is supplied in an environment that will allow the reduction of the metal species.

7. The method of claim 6, wherein the environment comprises an inert gas selected from the group helium, argon, nitrogen, or mixtures thereof.

8. The method of claim 7, wherein carbon monoxide and carbon dioxide are added to the environment at a ratio of between about 0.16 and about 6.

9. The method of claim 7, wherein carbon monoxide and carbon dioxide are added to the environment at a ratio of between about 0.3 and about 2.5.

10. The method of claim 1 or 2, wherein the nitriding material is a nitrogenous gas.

11. The method of claim 10, wherein the nitrogenous gas is ammonia.

12. The method of claim 2, wherein the binder comprises a carbonaceous material.

13. The method of claim 2, wherein the carbonaceous material comprises a mixture comprising flour, sugar, and a vegetable oil.

14. The method of claim 1 or 2, wherein the heat is supplied to the mixture in a plurality of intervals.

15. The method of claim 1 or 2, wherein the heat is supplied to this mixture at a constant rate of increase.

16. The method of claim 14, wherein the heat is supplied to the mixture within the interval at a constant rate of increase.

17. The method of claim 15, wherein the rate of increase is up to about 20° C./min.

18. The method of claim 16, wherein the rate of increase is up to about 20° C./min.

19. The method of claim 15, wherein the heat is supplied to the mixture until a temperature of between about 650° C. and about 900° C. is reached.

20. The method of claim 16, wherein the heat is supplied to the mixture until a temperature of between about 650° C. and about 900° C. is reached.

21. The method of claim 16, wherein the heat is supplied to the mixture in two intervals.

22. The method of claim 21, wherein the heat is supplied to the mixture in the first interval at a first rate of increase and in the second interval at a second rate of increase.

23. The method of claim 22, wherein the first rate of increase is between about 0.1° C./min. and about 10° C./min.

24. The method of claim 22, wherein heat is supplied to the mixture in the first interval until a temperature of between about 100° C. and about 200° C. is reached.

25. The method of claim 22, wherein the first rate of increase is between about 0.2° C./min and about 5° C./min and heat is supplied to the mixture in the first interval until temperature of about 125° C. is reached.

26. The method of claim 22, wherein the second rate of increase is between about 1° C./min. and about 20° C./min.

27. The method of claim 22, wherein heat is supplied to the mixture in the second interval until a temperature of between about 650° C. and about 900° C. is reached.

28. The method of claim 22, wherein the second rate of increase is between about 5° C./min to about 10° C./min and heat is supplied to the mixture in the second interval until a temperature of between about 675° C. and about 825° C. is reached.

29. The method of claim 2, wherein in step c) the mixture is formed into a cylindrical rod.

30. The method of claim 1 or 2, wherein the metal species and carbon source are combined in a polar solvent.

31. The method of claim 30, wherein the polar solvent is water.

32. The method of claim 1 or 2, wherein the metal species is in particulate form having a particle size of up to about 300 microns.

33. The method of claim 1 or 2, wherein the metal species is in particulate form having a particle size of between about submicron and about 20 microns.

34. The method of claim 1 or 2, wherein the metal species has a surface area of between about 0.2 $m^2/g$ and about 300 $m^2/g$.

35. The method of claim 1 or 2, wherein the metal species has a surface area of between about 1 $m^2/g$ and about 150 $m^2/g$.

36. The method of claim 1 or 2, wherein the carbon source is in particulate form having a particle size of up to about 300 microns.

37. The method of claim 1 or 2, wherein the carbon source is in particulate form having a particle size of between about submicron and about 40 microns.

38. The method of claim 1 or 2, wherein the carbon source has a surface area of between about 0.5 $m^2/g$ and about 2000 $m^2/g$.

39. The method of claim 1 or 2, wherein the carbon source has a surface area of between about 100 and about 600 $m^2/g$.

40. The method of claim 1 or 2, wherein the nitriding material is contacted with the mixture at a temperature of between about 400° C. to about 600° C.

41. The method of claim 1 or 2, wherein the nitriding material is contacted with the mixture for up to about 150 min.

42. The method of claim 1 or 2, wherein the nitriding material is contacted with the mixture at a temperature of between about 450° C. and about 500° C. for between about 30 min and about 120 min.

43. A heat source comprising metal nitride, wherein the heat source is substantially in the form of a cylindrical rod and has one or more fluid passages therethrough.

44. The heat source of claim 43, wherein the cylindrical rod has a diameter of between about 3.0 mm and about 8.0 mm, and a length of between about 8 mm and about 20 mm.

45. The heat source of claim 43, wherein the cylindrical rod has a diameter of between about 4.0 mm and 5.0 mm.

46. The heat source of claim 43, wherein the cylindrical rod has a length of between about 10 mm and 14 mm.

47. The heat source of claim 43, wherein the fluid passages are formed in the shape of a multi-pointed star.

48. The heat source of claim 43, wherein the fluid passages are formed as grooves around the circumference of the cylindrical rod.

49. A heat source for use in a smoking article comprising metal nitride, low valency metal oxide and carbon.

50. The heat source of claim 49, wherein the metal nitride is iron nitride and the low valency metal oxide is FeO.

51. The heat source of claim 49, wherein the heat source has an ignition temperature of between about 175° C. and about 450° C.

52. The heat source of claim 49, wherein the heat source has an ignition temperature of between about 190° C. and 400° C.

53. The heat source of claim 49, wherein, upon combustion, the heat source reaches a maximum temperature of between about 600° C. and about 950° C.

54. The heat source of claim 49, wherein, upon combustion, the heat source reaches a maximum temperature of between about 650° C. and about 850° C.

55. A heat source comprising metal nitride, low valency metal oxide, and carbon.

56. A smoking article comprising a heat source, wherein the heat source comprises metal nitride.

* * * * *